United States Patent
Wong et al.

(10) Patent No.: US 11,410,513 B2
(45) Date of Patent: Aug. 9, 2022

(54) SYSTEM AND DEVICE FOR VIDEO-BASED VEHICLE SURROUNDING AWARENESS MONITORING FOR AIR CARGO TRANSIT SECURITY UNDER ALL-WEATHER DRIVING CONDITIONS

(71) Applicant: Logistics and Supply Chain MultiTech R&D Centre Limited, Pok Fu Lam (HK)

(72) Inventors: Kwong Yeung Simon Wong, Pok Fu Lam (HK); To Bun Ng, Pok Fu Lam (HK); Kwong Tim Chan, Pok Fu Lam (HK)

(73) Assignee: Logistics and Supply Chain Multitech R&D Centre Limited, Pok Fu Lam (HK)

( * ) Notice: Subject to any disclaimer, the term of this patent is extended or adjusted under 35 U.S.C. 154(b) by 0 days.

(21) Appl. No.: 16/823,579

(22) Filed: Mar. 19, 2020

(65) Prior Publication Data
US 2021/0295664 A1    Sep. 23, 2021

(51) Int. Cl.
*G08B 13/196* (2006.01)
*G08B 13/189* (2006.01)

(52) U.S. Cl.
CPC ... *G08B 13/19647* (2013.01); *G08B 13/1895* (2013.01); *G08B 13/19632* (2013.01); *G08B 13/19669* (2013.01); *G08B 13/19673* (2013.01)

(58) Field of Classification Search
CPC .......... G08B 13/19647; G08B 13/1895; G08B 13/19632; G08B 13/19669; G08B 13/19673
See application file for complete search history.

(56) References Cited

U.S. PATENT DOCUMENTS

| | | | |
|---|---|---|---|
| 10,507,766 B1 * | 12/2019 | Gable | B60Q 1/2657 |
| 2014/0152823 A1 * | 6/2014 | Breed | G01S 17/931 |
| | | | 348/148 |
| 2016/0297361 A1 * | 10/2016 | Drazan | H04N 5/2256 |
| 2019/0056736 A1 * | 2/2019 | Wood | G05D 1/0246 |

OTHER PUBLICATIONS

Support Tool User Guide for PBS Blueprint Vehicle Design and Approval Prime-Mover and Semi-Trailer Combinations (Apr. 2013) (Year: 2013).*

* cited by examiner

*Primary Examiner* — Hesham K Abouzahra
(74) *Attorney, Agent, or Firm* — Renner, Kenner, Greive, Bobak, Taylor & Weber (57) ABSTRACT

A video-based security system for providing video security to cargo transport vehicle. The security system includes a camera support configured at the exterior of a cargo storage area; a camera system attached to the camera support for covering a top plane, front plane, left plane, right plane, and back plane of a cargo area; and a main unit connecting to the camera system for logging incident records.

25 Claims, 5 Drawing Sheets

SYSTEM AND DEVICE FOR VIDEO-BASED VEHICLE SURROUNDING AWARENESS MONITORING FOR AIR CARGO TRANSIT SECURITY UNDER ALL-WEATHER DRIVING CONDITIONS

TECHNICAL FIELD

The invention relates to a video-based security system and device for providing video security to cargo transport trucks. In particular, the present invention relates to a system and device for video-based vehicle surrounding awareness monitoring for air cargo transit security under all-weather driving conditions.

BACKGROUND

Air cargo security monitoring during transit between two security check points is one of the weakest links in the entire security measure. Cargo nets and bags are used primarily to restrain cargo in the vehicle. Cargo nets are made of rope fabricated into a large square patterned net structure. The cargo nets can be constructed with woven webbing stitched together.

In use, cargo nets or bags are subjected to substantial wear and tear. The environment in which cargo nets and bags are used creates extensive abrasion on the net or bag structure. Cargo nets or bags may be significantly damaged by exposure to extreme weather conditions, repeated attachment and removal, dragging across rough surfaces, and working with machinery such as cranes. Using bags and nets are relatively costly. Besides, time and location for potentially detected intrusion cannot be easily tracked. Hence, relying on these traditional security means is very unreliable.

SUMMARY OF THE INVENTION

The present invention relates to a video-based security system and device for providing video security to cargo transport truck.

It may be advantageous to provide a video-based security system and device for providing video security to cargo transport truck that is not limited the container space, size, and condition.

Other advantages will become apparent when taken into consideration with the following specification and drawings.

Embodiments of the present invention may overcome or ameliorate at least one of the disadvantages of the prior art, or to provide a useful alternative.

In a first aspect of the present disclosure, there is provided a video-based security system for providing video security to cargo transport vehicle comprising:

a camera support configured at the exterior of a cargo storage area;

a camera system attached to the camera support for covering a top plane, front plane, left plane, right plane, and back plane of a cargo area;

a main unit connecting to the camera system for logging incident records.

Preferably, the vehicle comprises a prime mover towing a trailer, wherein the trailer has the cargo area adapted to carry cargo.

Preferably, the camera support comprising a left exhaust pipe on a left side of the prime mover for attaching a first camera of the camera system, and a right exhaust pipe on a right side of the prime mover for attaching a second camera of the camera system.

Preferably, the camera support comprising a left pole on a left side of the vehicle for attaching a first camera of the camera system, and a right pole on a right side of the vehicle for attaching a second camera of the camera system.

Preferably, the left pole and right pole are secured to a front end of the trailer.

Preferably, the left pole and right pole are configured to provide a front clearance distance from the cargo area of 10 cm to 50 cm.

Preferably, each of the left pole and right pole has an adjustable height.

Preferably, each of the left pole and right pole has an arm extending horizontally from a top end of the pole, wherein the arm has a length of 10 cm to 50 cm.

Preferably, the arm has an adjustable length.

Preferably, each of the left pole and right pole is rotatable.

Preferably, the camera support comprising an extension for attaching a third camera of the camera of the camera system at a back side of the vehicle.

Preferably, the camera system comprises one or more cameras having lens with angles of view between 110 to 220 degrees.

Preferably, wherein the camera system comprises one or more cameras adapted to capture image covering fields of view of 160 to 360 degrees.

Preferably, the camera system comprises a camera having multiple sensors.

Preferably, the camera system is in communication with a main unit to process images captured by the camera system, wherein the main unit is adapted to communicate to a server.

Preferably, the main unit and the server are adapted to carry out the process comprising steps of:

defining a security zone of an image captured by the camera system;

detecting any object projecting into, out of, or within the security zone;

logging an incidence event record on a storage device on the main unit;

Preferably, a security zone is defined by identifying the cargo area on the top plane, front plane, left plane, right plane, and back plane.

Preferably, each of incident records a secured record comprising one or more of attributes of a truck ID, a time-tag, a duration time, a geospatial-tag, continuous time-tagged geospatial data, video clip, and an incident description.

Preferably, the main unit is adapted to trigger a light indicator for any detected intrusion.

Preferably, the main unit is adapted to communicate with an on-site server for reviewing all incident records stored in the main unit to decide whether to issue intrusion-free clearance comprising a signer ID, a signing time-tag to the main unit.

Preferably, the main unit is adapted to communicate with a server for transmitting an incident record in real time for alerting a user through a web application or mobile application.

Preferably, the main unit is adapted to communicate with a server for transmitting video clip in real time for reviewing and verifying the truthfulness of intrusion.

Preferably, the step of detecting any object projecting into, out of, or within the security zone comprises the steps of:

storing a time series of images captured by the camera system;

performing statistical change detection to determine a change area;

performing spatial refinement to determine an object of interest; and calculating one or more metadata of the object of interest.

Preferably, the camera system is adapted to perform image stabilization via optical image stabilization or electronic image stabilization.

Preferably, the camera system comprises one or more image sensors that contain two, or more, types of pixels, with different light sensitivities to generate a single image by merging images captured by the image sensors with different exposure times.

Preferably, the camera system is adapted to filter background environment before processing images captured by the camera system.

DETAILED DESCRIPTION OF THE PREFERRED EMBODIMENT

Cargo carrying vehicles are commonly used to transport goods on land. There are different types of Cargo carrying vehicles, such as rigid trucks, articulated trucks, fuel tanker, dump truck, garbage truck, etc.

The inventors have, through their own research, trials and experiments, devised that security for a cargo transport vehicle may be enhanced by installing surveillance equipment, such as cameras, microphones, global positioning equipment, etc on the vehicle. The surveillance equipment typically transmits radio signals to monitoring and recording equipment located at a remote site, such as a surveillance headquarter.

For example, a system of utilizing a camera array system to detect a load status of a semi-trailer truck may be used. The system may comprise a sensor array affixed to the top of the trailer to automatically determine whether a cargo area of the semi-trailer truck is occupied. Each camera of the set of cameras is embedded in an individual recess such that each of the set of cameras does not protrude from the sensor array into the cargo area. The trailer of the semi-trailer truck further includes at least one light source to illuminate the cargo area. This system uses an array of cameras which requires a lot of resources. An additional light source would give rise to another point of failure.

In an alternative example, a semi-trailer with concealed camera placements may be used. This system may appear to be normal parts of a normal trailer. The trailer is designed to have a translucent roof portion admitting light. The camera placements are located within the top scaffold of the trailer that is present in many trailers. The concealed camera will only work with an enclosure that has space. In many instances, a container is filled and blocks the concealed camera. Other enclosures may carry dangerous goods that do not allow the installation of electrical devices.

In yet another example, a monitoring system component within a tractor trailer may also be used. This system may comprise one monitor placed inside the trailer and another one placed outside on the rear door. The monitors communicate with an application downloaded to the user's smartphone device, allowing the user to monitor the cargo. The monitor is placed within the semitrailer in the most optimal position in order to act as a visual surveillance device within the semitrailer, as well as monitoring and transmitting the conditions inside the semitrailer, including but not limited to monitoring temperature, motion, and light. The monitors will only work with an enclosure that has space. In many instances, a container is filled and blocks the monitors. Other enclosures may carry dangerous goods that do not allow installation of electrical devices. The monitor inside the enclosure requires a light source to illuminate the environment. An infrared monitor may be used but it is not practical for many containers as the temperature inside the container can be very high or very low which make it impossible for the infrared sensor to differentiate objects and environment.

There is a need for a surveillance system is not restricted by the container enclosure, including but not limited to the shape, size, condition for a cargo transport vehicle.

In the previous examples, the video surveillance system may be installed inside the vehicle to monitor the status of the cargo. This kind of system may require clearance inside the cargo enclosure. It will definition not fit for a flatbed trailer where there is no enclosure. It will also not suitable for fuel tanker as it is a hazard to install electrical devices inside the fuel tank. It will also suitable for garbage trucks, as the garbage will block or damage the camera lens and reduce visibility.

Further, installing a camera inside an enclosed space requires illumination. Some prior art products use electrical lighting inside the container. An extra piece of equipment inside the container means more power is required. This produces more vulnerable points for system failure. Other may use infrared sensors. However, an enclosed container tends to overheat in transportation. In other occasions, the container may be frozen inside. Either way, the ambient temperature and the object temperature is too close for the infrared sensor to differentiate.

Preferably, according to an embodiment of the present invention, the system or method may include the detection of any intrusion using video analytics technology with the system. Intrusion detection is defined as an object entering a virtual plane from an open area to a secure area.

Figure 2:
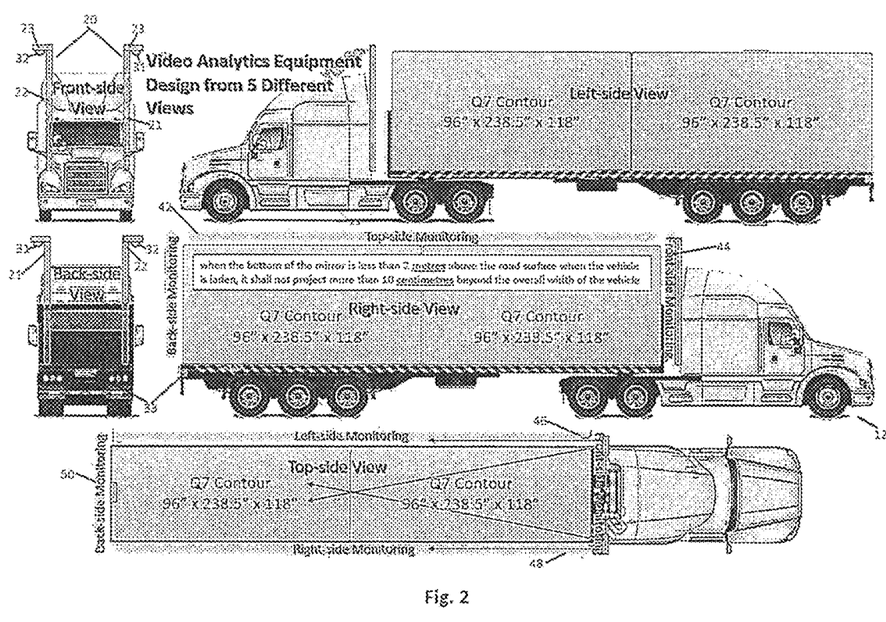
FIG. 2 is schematic diagram of an articulated container truck implementing a video-based security system for providing video security to cargo transport vehicle of an embodiment of the present invention.

In the context of transport cargo security, five virtual planes (four lateral and top plane 42, 44, 46, 48, 50 marked in red dotted lines in the illustrations in FIG. 2) are set up to form the boundaries between the outer open area and inner secure area. Each virtual plane is monitored by video analytics technology of an embodiment of the present invention for detecting any possible intrusion to the secure zone.

When the bottom of the mirror is less than two metres above the road surface when the vehicle is laden, it shall not project more than ten centimetres beyond the overall width of the vehicle.

Figure 1:
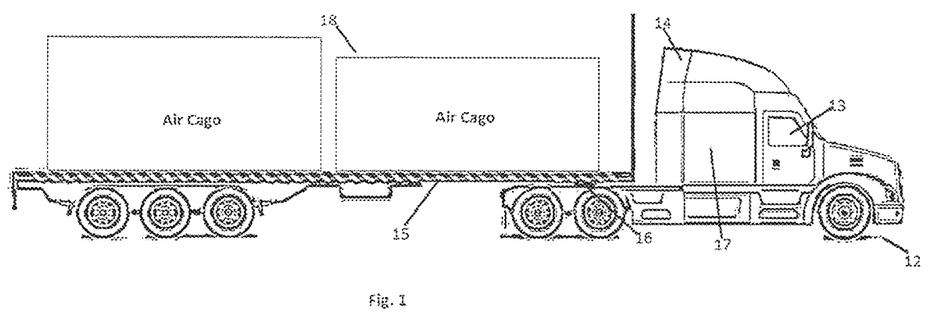
FIG. 1 is schematic diagram of a flatbed truck implementing a video-based security system for providing video security to cargo transport vehicle of an embodiment of the present invention.

Referring to FIG. 1, there is shown an example of a video-based security system and device 10 for providing video security to cargo transport vehicle 12, such as rigid trucks, articulated trucks, fuel tanker, dump truck, garbage truck, etc.

In one embodiment of the present invention, the video-based security system and device 10 comprise a camera support 20 configured external to a cargo storage area 18; a camera system 30 attached to the camera support for covering a top plane 42, front plane 44, left plane 46, right plane 48, and back plane 50 of the cargo area; and a main unit 60 connecting to the camera system for logging incident records.

In this example, a cargo transport vehicle 12 comprises a cabin 13 to accommodate the driver. In one embodiment, the engine and hood over of the cabin is located the front axle in front of the cabin. In another embodiment, the cabin 13 is located over the engine to form a flat nose cabin with the driver sitting in front of the front axle. Some cabin has an air damp on top.

In one embodiment, the cargo transport vehicle 12 is a rigid truck in which the cabin 13 and the cargo area form a single unit. Many garbage trucks, concrete trucks, lorries are classified as rigid truck.

In another embodiment, the cargo transport vehicle 12 comprises a tractor unit or prime mover 14 connect to a trailer 15 with a fifth wheel coupling 16. The cabin 13 is located at the prime mover wherein the trailer has the cargo area adapted to carry cargo. Some prime mover comprises a sleeper 17.

In one embodiment, the prime mover has a left exhaust pipe attached around the left hand side of the cabin 13 rear region and a right exhaust pipe attached around the right hand side of the cabin rear region. Typically, the rear cabin also provides a power cord and air cord to attached to the trailer 15.

There are different types of trailer 15 for different cargo. For example, the trailer can be a box trailer, a curtain sider trailer, a dump trailer, an auto transporter, a flatbed trailer, a refrigerated trailer, a fuel tanker, a container trailer, etc.

In some cargo transport vehicle 12, the cabin 13 and a front plane 42 of the cargo area has a cabin to body clearance.

In one embodiment of the present invention, the video-based security system has a camera support 20 comprising a left exhaust pipe on a left side of the prime mover 14 for attaching a first camera 31 of the camera system 30, and a right exhaust pipe on a right side of the prime mover for attaching a second camera 32 of the camera system. For example, the exhaust pipes may be located at an area of the cabin to body clearance.

However, exhaust pipes on most cargo transport vehicle 12 produce heat, vibration, smoke, and dust. Attaching a camera system 30 at the exhaust pipe may reduce the initial configuration cost, but it adversely affects the efficiency and life span of the camera system.

In one embodiment of the present invention, there is provided a video-based security system 10 having a camera support 20 comprising a left pole 21 on a left side of the cargo transport vehicle 12 for attaching a first camera 31 of the camera system 30, and a right pole on a right side of the cargo transport vehicle for attaching a second camera 32 of the camera system.

In one embodiment, the left pole 21 and right pole 22 are attached to the prime mover 14 in an area at the cabin and body clearance. However, when the cargo transport vehicle 12 perform a turn, the prime mover 14 will perform an acute angle turn first. The trailer 15 may still maintain its previous heading. Hence, a part of the trailer 15 may fall out of the image cover area of the camera system 30. To ameliorate this problem, the camera system 30 may be rotated in an opposite direction of the prime mover 14 to ensure the image maintain its cover over entire cargo area 18.

Preferably, the left pole 21 and right pole 22 are secured to a front end of the trailer 15 instead of the prime mover 14. In one embodiment, the left pole 21 and right pole 22 are configured to provide a front clearance distance from the front plane 44 of the cargo area of 10 cm to 50 cm. This clearance distance will allow a camera with a view angle of 50 to 120 degree to cover the entire height of the cargo area of 3 m to 6 m.

In one embodiment, the left pole 21 and right pole 22 are configured to provide a top clearance distance from the top plane 42 of the cargo area of 10 cm to 50 cm. This clearance distance will allow a camera with a view angle of 110 to 180 degree to cover the entire length of the cargo area of 6 m to 20 m. In another embodiment, each of the left pole 21 and right 22 pole has an adjustable height. The height of the poles 21, 22 may be adjusted manually or by a linear actuator. The poles 21, 22 may comprise a top portion telescopically engaged with a bottom portion. A screwing or secure pin mechanism may be used to connect the top portion and bottom portion with adjustable height.

The adjustable poles also make it easier to replace the cameras attached to the poles 21, 22 by lowering the camera to around a human height. In one embodiment, the main unit 60 may detect the bridge or tunnel clearance and lower the poles 21, 22 to ensure safe passage.

In one embodiment, each of the left pole 21 and right pole 22 has an arm 23 extending horizontally from a top end of the pole, wherein the arm has a length of 10 cm to 50 cm. This clearance distance will allow a camera with a view angle of 110 to 180 degree to cover the side plane of the cargo area of 6 m to 20 m.

Preferably, the arm 23 has an adjustable length. The length of the arm 23, may be adjusted manually or by a linear actuator. The arm may comprise a proximal portion telescopically engaged with a distal portion. A screwing or secure pin mechanism may be used to connect the proximal portion and the distal portion with adjustable length. In another embodiment, the camera system 30 will send images to the main unit 60.

In one embodiment, each of the left pole 21 and right pole 22 is rotatable. The poles 21, 22 may be rotated manually or by an actuator.

One embodiment of the present invention is adapted to provide real-time on-board intrusion detection transiting between two secure points. For example, the camera system 30 will send images to the main unit 60. The main unit 60 is adapted to perform a real time analysis to detect whether the camera system 30 covers the entire cargo area 18. The main unit 60 comprises an actuator controller to control one or more actuators to adjust the position of the camera system 30 to ensure the camera system 30 cover the entire cargo area 18.

In one preferred embodiment, the camera support 30 comprising an extension for attaching a third camera 33 of the camera system 30 at a back side of the vehicle to cover the back plane 50 of the cargo area 18.

The camera system 30 may comprise different types of cameras. In one embodiment of the present invention, the camera system comprises one or more cameras having lens with angles of view between 110 to 220 degrees or fisheye view. In another embodiment, the camera system comprises one or more cameras adapted to capture image covering fields of view of 160 to 360 degrees or panoramic view.

In another embodiment, the camera system 30 comprises a single camera unit having multiple sensors. One of the sensors may have one kind of pixel sensitivity while another sensor may have a different kind of pixel sensitivity. Alternatively, one of the sensors may be an RGB colour sensor while the other is an infrared sensor. In yet, another embodiment, both sensors are used to cover a wider angle of view.

The camera system 30 in one preferred embedment comprises one or more image sensors that contain two, or more, types of pixels, with different light sensitivities to generate a single image by merging images captured by the image sensors with different exposure times.

The camera system 30 of an embodiment of the present invention is adapted to perform image stabilization via optical image stabilization or electronic image stabilization. Preferably, this process is carried out before the images are sent to the main unit 60. As such the camera system 30 may comprise one or more memory caches for storing images and one or more digital signals processor for carrying image stabilization. In one embodiment, the cameras of the camera system 30 comprises a digital gyroscope, level, and/or accelerometer to improve the image stabilization process.

The video-based security system 10 of an embodiment of the present invention has a camera system is in communication with a main unit 60 to process images captured by the camera system. In one embodiment, the camera system 30 is directly wired to the main unit 60. The wiring may be a coaxial cable or HDMI cable depending on the interfaces provided by the main unit 60. Preferably, the camera of the camera system 30 is a network camera comprising Ethernet cable of category 5 or above. In one embodiment, the network cameras are adapted to communicate with the main unit 60 through wireless protocols, such as Wi-Fi™, or Bluetooth™, etc.

Figure 3:
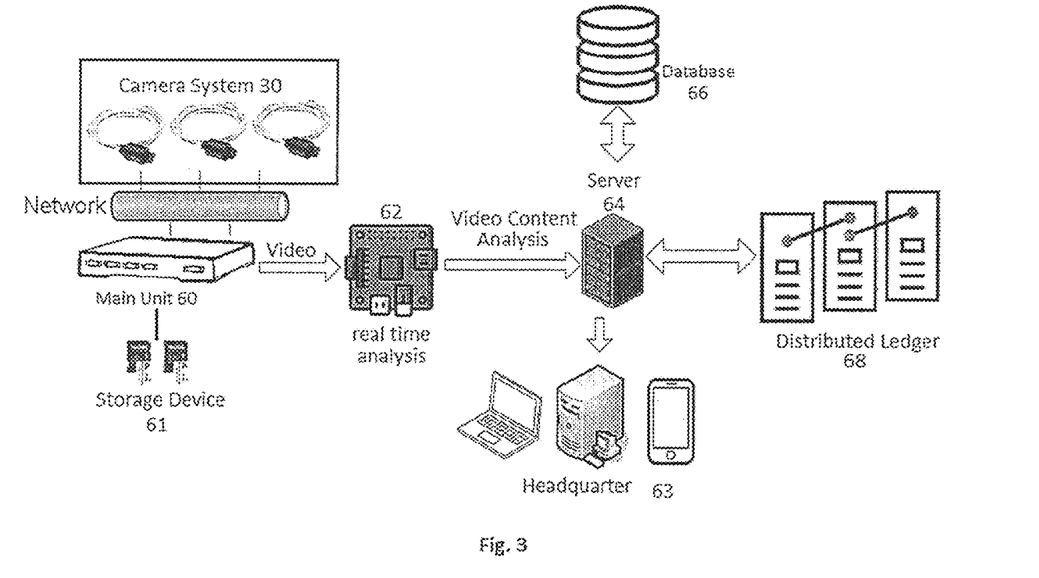
FIG. 3 is a schematic diagram a video-based security system for providing video security to cargo transport vehicle of an embodiment of the present invention.

In one embodiment of the present invention, the main unit 60 comprises a global positing system (GPS) to detect the current location of the main unit. The main unit 60 may also associate with a mobile communication module or satellite communication module to transmit data to a server.

The main unit 60 of an embodiment of the present invention comprises an embedded system 62 with central processing unit and a digital signal processing for processing the images received from the camera system 30. However, when it is possible, the main unit 60 will send the videos and images to the server 64 for more complex video content analysis. The server 64 may associate a database system 66 for storage and retrieving video data. The database system 64 may be a cloud-based database, distributed database, or local database.

Figure 4:
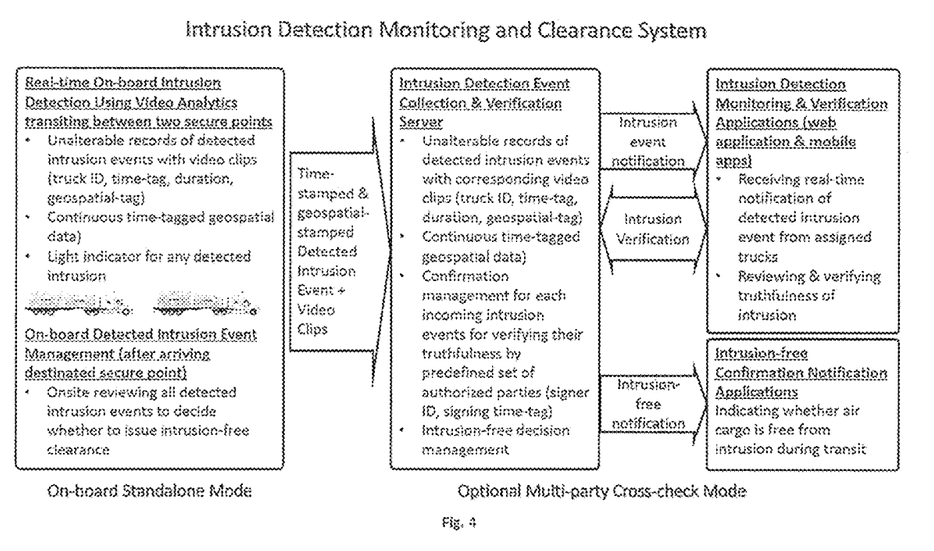
FIG. 4 is the schematic diagram of a process carrying out by the video-based security system of FIG. 3.

In one embodiment, the video-based security system 10 has the main unit 60 and a server adapted to carry out the process for detecting and recording an incident event, such as intrusion or fall out of cargo. The process first carries out the step of defining a security zone of an image captured by the camera system.

The security zone is defined by identifying the cargo area on the top plane 42, front plane 44, left plane 46, right plane 48, and back plane 50. Preferably, the main unit 60 or the server will receive a number of images of the cargo area. Using trained image pattern recognition detectors via deep learning methods, the main unit 60 or the server 64 will able to generate the spatial parameter of the cargo area which is supposed to be stagnant or undisturbed. In one embodiment, this spatial parameter may be sent the camera system 30 such that the camera system is adapted to filter background environment before processing images captured by the cameras. In this way, the images to be processed will have less noise due to the rapid changing background of a moving vehicle.

As the spatial parameter can be generated and regenerate any time, the video-based security system 10 is adapted to create a security zone for different type and shape of cargo or trailer, such as fuel tanker or irregular goods on a flatbed trailer. The cargo can be loaded and unloaded during the trip without affecting the performance of the video-based security system 10.

Once the spatial parameter of the security zone is defined, the main unit 60 can concentrate on the changes inside the security zone to detect any object projecting into, out of, or within the security zone. In many circumstances, the security zone reflects a fairly stable or stagnant as it moves at the same displacement as the camera support 20 and the camera system 30.

Figure 5:
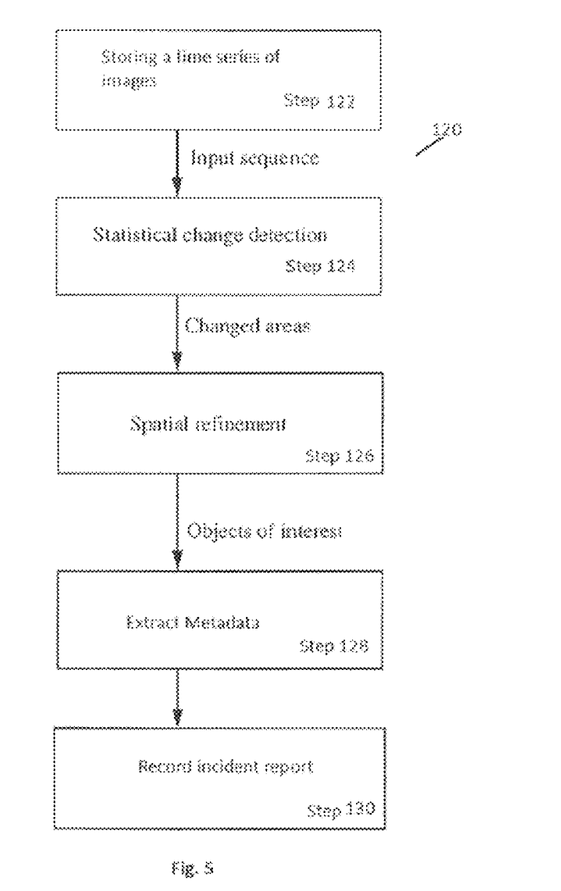
FIG. 5 is the schematic diagram of an intrusion detection process carrying out by the video-based security system of FIG. 3.

The main unit 60 of an embodiment of the present invention may detect any object projecting into, out of, or within the security zone using a method 120 comprises the steps of: storing a time series of images captured by the camera system in step 122. In one embodiment, the main unit comprises an array of buffer memory for storing the time series images for processing. The digital signal processor may then perform statistical change detection on the security zone to determine a change area in step 124.

In one embodiment, the statistical change detection algorithm performs a threshold operation on a simple difference image in order to simply extract the moving objects. The algorithm may comprise the step of comparing the statistical behaviour of a small neighbourhood of each pixel position in within the parameter of the security zone with a model of the noise that is expected to affect the squared difference image. The comparison may be merely a process of calculating the difference between the values of the pixel or carrying out a statistical significance test to decide whether the pixel belongs to a changed area or to a noisy area in the image according to a threshold.

The pre-processing of the images, such as the definition of the spatial parameter of the security zone make it more efficient and accurate in detecting a change in the security zone. Depending on the statistics change detection algorithm, the object detection process can be cost effective making it possible to carry out by the main unit 60 in real time.

Once an object of interest is detected, the main unit 60 may perform spatial refinement algorithm to determine an object of interest in step 126. The spatial refinement algorithm is applied to eliminate shadow and other high level noise on the image. In one embodiment, a multi-feature clustering algorithm in order to detect those regions that are homogeneous with respect to the chosen features. The multi-feature clustering algorithm may produce a local segmentation. The local segmentation is then integrated into the whole image. A local comparison between the background and its adjacent regions belonging to the changed areas is used as an image refinement process to eliminate shadow and other high level noise.

Once an object of interest is detection, the main unit 60 may also calculate one or more metadata of the object of interest in step 128. The high-level semantic metadata may include entry or exit point of the object, object speed, trajectory direction and locus, object duration time, etc. In one embodiment, the metadata is handled and calculated by the server 64. An incident record may then be record in Step 130.

In one embodiment, the main unit 60 is adapted to transmit incident records and video clips to the server 64 for more detailed video content analysis. The server 64 may comprise a pattern or object recognition software to identify the particular object of interest. In one embodiment, the pattern or object recognition software is adapted to identify human intruders and carry out facial recognition to identify whether the intruder is an authorised person. As such the monitor staff at headquarter does not need to remember all the faces of the ground workers. It is possible that the pattern or object recognition software is capable of detecting smoke, flame, or fire.

When the main unit 60 detects that there is any object projecting into, out of, or within the security zone, the main unit 60, the main unit will log the incident record on a storage device 61 attached thereon. Each of incident records can be a secured record comprising one or more of attributes of a truck ID, a time-tag, a duration time, a geospatial-tag, continuous time-tagged geospatial data, video clip, and an incident description.

In one embodiment, the record is secured by encryption or hashing algorithm using a public key provided by the server 64 or stored locally in the main. The encryption or hash algorithm is preferably using a security key with 2048 bits or more. In one embodiment, the secured record is forward to the server 64 or an agent for storing the secured to a distributed ledger 68. This may allow record and storage of unalterable records of detected intrusion events with video clips (truck ID, time-tag, duration, geospatial-tag).

In one embodiment of the present invention, the main unit 60 has a light controller associated with a light indicator. The light indicator may produce one or more colour of light signals, such as yellow, red, green, etc. When the main unit 60 detects an intrusion or fall out of cargo, the light controller is adapted to trigger a light indicator, such as turning green to yellow. In this instance, the driver may notice an incident record has been logged but that incident can be a false positive or not involving any security breach.

In another embodiment, the incident record is sent to the server 64 for verifying the incident in the headquarter 63. The main unit is adapted to communicate with a server 64 for transmitting video clip in real time for reviewing and verifying the truthfulness of intrusion. If the headquarter issues a clearance rejection to the main unit 60, the main unit may turn the light indicator signal to red. The light indicator may be installed on the dashboard or front panel in the driver cabin 13 such that the driver will notice a clearance rejection has been issued and the cargo carry vehicle 12 is denied to access the secured area of the transportation hub.

The main unit 60 in an embodiment of the present invention is adapted to communicate with an on-site server 64 for reviewing all incident records stored in the main unit to decide whether to issue intrusion-free clearance comprising a signer ID, a signing time-tag to the main unit.

In one embodiment, the main unit 60 is adapted to communicate with a server 64 for transmitting an incident record in real time for alerting a user through a web application or mobile application. The server 64 may store the incident records received from the cargo carrying vehicle 12 on a secured database or distributed ledger.

In one preferred embodiment of the present invention, there is provided a flatbed truck as shown in FIG. 1 for transporting one or more cargos. The flatbed truck comprises four lateral and top sides which may be wide open. Using video analytics technologies of an embodiment of the present invention, it is possible to monitor the open area (top and four lateral sides) of the flatbed trailer during the entire transit between two security check points The flatbed truck of the embodiment of the present invention may have video analytics equipment 10 with the ability to provide stabilized full coverage of all open areas for intrusion detection securely installed on the truck. The video analytics equipment 10 comprises a plurality of camera attached to a main unit 60 to perform real-time intrusion detection on-board and passing intrusion event. Video clips are recorded by the video analytics equipment 10 and send to monitoring server for verifying by multiple authorized parties. The server 64 may then finalize and issue an intrusion-free clearance of incoming air cargo at the airport to the flatbed truck.

Video analytics equipment 10 of the embodiment of the present invention is adapted to provide a full viewing coverage of all five open sides of the flatbed truck 10, including two front-top camera units, each covering 3 sides. These two front top cameras may include a left-front-top camera unit: Left, front, and top sides, and right-front-top camera unit to cover the right, front and top sides. There is also one back-bottom camera unit covering back side.

When the bottom of the mirror is less than two metres above the road surface when the vehicle is laden, it shall not project more than ten centimetres beyond the overall width of the vehicle. When the bottom of the mirror is less than two metres above the road surface when the vehicle is laden, it shall not project more than ten centimetres beyond the overall width of the vehicle.

The present invention may also be installed on marine cargo transport vehicle such as container ship and cargo transport boat, etc.

Advantageously, the system according to embodiments of the present invention may be used for cargo transportation including but not limited to rigid trucks, semi-trailer trucks, articulated trucks, etc. The end product of the present invention may be used for cargo transportation security using video surveillance.

It will also be appreciated that where the methods and systems of the present invention are either wholly implemented by computing system or partly implemented by computing systems then any appropriate computing system architecture may be utilised. This will include standalone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A video-based security system for providing video security to cargo transport vehicle comprising:
   a camera support configured at the exterior of a cargo storage area;
   a video analytics equipment including a camera system attached to the camera support for covering a top plane, front plane, left plane, right plane, and back plane of a cargo area, and for storing a series of images captured by the camera system;

a main unit connecting to the camera system for logging incident records, including an intrusion associated with an object entering the top plane, the front plane, the left plane, the right plane, or back plane, from an open area to a secure area;

wherein the main unit is further arranged to generate spatial parameter of a cargo area which is supposed to be stagnant or undisturbed, the spatial parameter is sent the camera system for filtering a background before processing images captured by the cameras;

wherein the main unit comprises a digital signal processor arranged to process the images by perform statistical change detection on the secure area to determine change areas of the secure area in the images captured by the camera system;

wherein the main unit is further arranged to perform spatial refinement to detect regions that are homogeneous with respect to one or more chosen features and to perform a local comparison between the background and its adjacent regions belonging to the changed area so as to determine an object of interest using multi-feature clustering; and wherein the main unit is further arranged to determine one or more high-level semantic metadata of the object of interest, thereby to determine the intrusion of the object, upon the object of interest is detected.

2. The video-based security system of claim 1, wherein the vehicle comprises a prime mover towing a trailer, wherein the trailer has the cargo area adapted to carry cargo.

3. The video-based security system of claim 2, wherein the camera support comprising a left exhaust pipe on a left side of the prime mover for attaching a first camera of the camera system, and a right exhaust pipe on a right side of the prime mover for attaching a second camera of the camera system.

4. The video-based security system of claim 2, wherein the camera support comprising a left pole on a left side of the vehicle for attaching a first camera of the camera system, and a right pole on a right side of the vehicle for attaching a second camera of the camera system.

5. The video-based security system of claim 4, wherein the left pole and right pole are secured to a front end of the trailer.

6. The video-based security system of claim 4, wherein the left pole and right pole are configured to provide a front clearance distance from the cargo area of 10 cm to 50 cm.

7. The video-based security system of claim 6, wherein each of the left pole and right pole has an adjustable height.

8. The video-based security system of claim 4, wherein each of the left pole and right pole has an arm extending horizontally from a top end of the pole, wherein the arm has a length of 10 cm to 50 cm.

9. The video-based security system of claim 8, wherein the arm has an adjustable length.

10. The video-based security system of claim 4, wherein each of the left pole and right pole is rotatable.

11. The video-based security system of claim 2, wherein the camera support comprising an extension for attaching a third camera of the camera of the camera system at a back side of the vehicle.

12. The video-based security system of claim 2, wherein the camera system comprises one or more cameras having lens with angles of view between 110 to 220 degrees.

13. The video-based security system of claim 2, wherein the camera system comprises one or more cameras adapted to capture image covering fields of view of 160 to 360 degrees.

14. The video-based security system of claim 2, wherein the camera system comprises a camera having multiple sensors.

15. The video-based security system of claim 2, wherein the camera system is in communication with the main unit to process images captured by the camera system, wherein the main unit is adapted to communicate to a server.

16. The video-based security system of claim 2, wherein the main unit and the server are adapted to carry out the process comprising steps of:
 defining a security zone of an image captured by the camera system;
 detecting any object projecting into, out of, or within the security zone;
 logging an incidence event record on a storage device on the main unit.

17. The video-based security system of claim 16, wherein a security zone is defined by identifying the cargo area on the top plane, front plane, left plane, right plane, and back plane.

18. The video-based security system of claim 1, wherein each of incident records a secured record comprising one or more of attributes of a truck ID, a time-tag, a duration time, a geospatial-tag, continuous time-tagged geospatial data, video clip, and an incident description.

19. The video-based security system of claim 1, wherein the main unit is adapted to trigger a light indicator for any detected intrusion.

20. The video-based security system of claim 1, wherein the main unit is adapted to communicate with an on-site server for reviewing all incident records stored in the main unit to decide whether to issue intrusion-free clearance comprising a signer ID, a signing time-tag to the main unit.

21. The video-based security system of claim 1, wherein the main unit is adapted to communicate with a server for transmitting an incident record in real time for alerting a user through a web application or mobile application.

22. The video-based security system of claim 21, wherein the main unit is adapted to communicate with a server for transmitting video clip in real time for reviewing and verifying the truthfulness of intrusion.

23. The video-based security system of claim 22, wherein the server is arranged to identify a human intruder and to carry out facial recognition to identify whether the human intruder is an authorized person.

24. The video-based security system of claim 1, wherein the camera system is adapted to perform image stabilization via optical image stabilization or electronic image stabilization.

25. The video-based security system of claim 1, wherein the camera system comprises one or more image sensors that contain two, or more, types of pixels, with different light sensitivities to generate a single image by merging images captured by the image sensors with different exposure times.

* * * * *